US008326085B2

(12) United States Patent
Yokoi

(10) Patent No.: US 8,326,085 B2
(45) Date of Patent: Dec. 4, 2012

(54) IMAGE PROCESSING APPARATUS AND IMAGE PROCESSING METHOD

(75) Inventor: Masanori Yokoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 812 days.

(21) Appl. No.: 12/480,610

(22) Filed: Jun. 8, 2009

(65) Prior Publication Data

US 2009/0316996 A1  Dec. 24, 2009

(30) Foreign Application Priority Data

Jun. 19, 2008 (JP) .................................. 2008-160949

(51) Int. Cl.
G06K 9/36 (2006.01)
G06K 9/48 (2006.01)
G06K 9/32 (2006.01)

(52) U.S. Cl. ......................... 382/289; 382/199; 382/298

(58) Field of Classification Search .................. 382/289, 382/199, 260, 263, 281, 298
See application file for complete search history.

(56) References Cited

U.S. PATENT DOCUMENTS

| 5,818,976 | A | 10/1998 | Pasco et al. | |
|---|---|---|---|---|
| 6,873,732 | B2 * | 3/2005 | Dance | ............................ 382/199 |
| 7,020,352 | B2 * | 3/2006 | O'Callaghan et al. | ........ 382/305 |
| 7,065,261 | B1 | 6/2006 | Horie | |
| 7,738,730 | B2 * | 6/2010 | Hawley | .......................... 382/281 |
| 2002/0028027 | A1 | 3/2002 | Koyama | |

FOREIGN PATENT DOCUMENTS

| JP | 3-213053 | | 9/1991 |
|---|---|---|---|
| JP | 5135174 | A | 6/1993 |
| JP | 10097625 | A | 4/1998 |
| JP | 2002084420 | A | 3/2002 |
| WO | 91/18366 | A1 | 11/1991 |

OTHER PUBLICATIONS

Search Report dated Jan. 28, 2010 in corresponding European Application No. 09163311.5.
Chin, et al., "Skewed Angle Detection in Text Images Using Orthogonal Angle View", International Conference on Circuits/Systems, Computers and Communications, Jul. 11, 2000, XP002563887, pp. 186-195.
Hull, "Document Image Skew Detection: Survey and Annotated Bibliography", Documents Analysis Systems II, World Scientific, XP002562656, 1998, pp. 40-64.

(Continued)

*Primary Examiner* — Yon Couso
(74) *Attorney, Agent, or Firm* — Fitzpatrick, Cella, Harper & Scinto

(57) ABSTRACT

The present invention enables inclination detection by detecting an inclination of a document image based on a feature of a document area. In order to achieve this, reduction processing is performed on document image data including the document area so as to generate a reduced document image corresponding to the document area that has been extracted. Thereafter, filter processing is performed on the reduced document image so as to generate an edge image by extracting at least one edge of the document area. Then, a straight line adjoining an edge of the edge image is detected using a Hough transformation so that the inclination of the document image is determined based on an inclination of the straight line. Consequently, inclination detection with high accuracy can be performed based on the feature of the document area.

14 Claims, 10 Drawing Sheets

OTHER PUBLICATIONS

Haralick, "Document Image Understanding: Geometric and Logical Layout", 1994 IEEE Computer Society Conference, Seattle, WA, Jun. 21, 1994, XP010099304, pp. 385-390.

Jung, et al., "Rectangle Detection based on a Windowed Hough Transform", Proceedings of the XVII Brazilian Symposium on Computer Graphics and Image Processing, Oct. 17, 2004, XP010737732, pp. 113-120.

Office Action dated Jun. 8, 2012 concerning Japanese Patent Application No. 2008-160949.

Office Action dated Apr. 13, 2012 in European Application No. 09163311.5.

Bloomberg, et al., "Measuring document image skew and orientation", Xerox Palo Alto Research Center, SPIE, vol. 2422, Feb. 6, 1995, pp. 302-316.

Okun, et al., "Document skew estimation without angle range restriction", IJDAR, vol. 2, No. 2-3, Dec. 1999, pp. 132-144.

* cited by examiner

F I G. 1
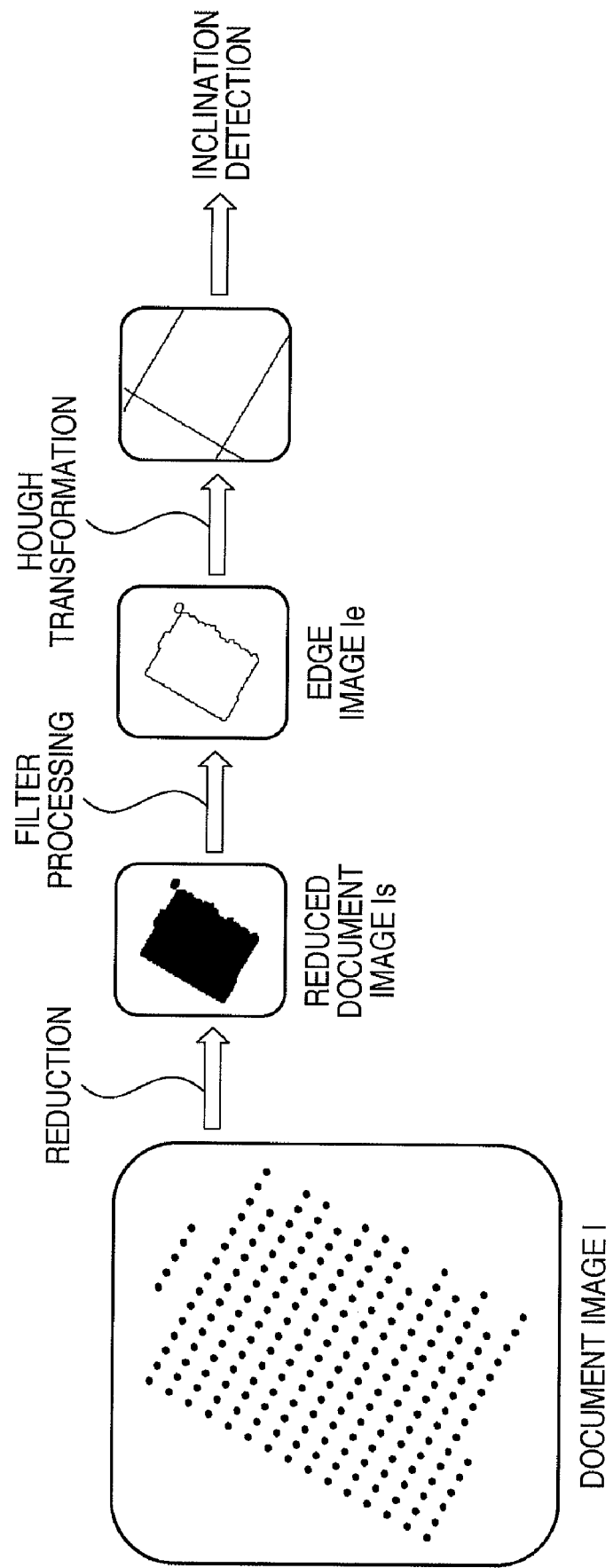

F I G. 5
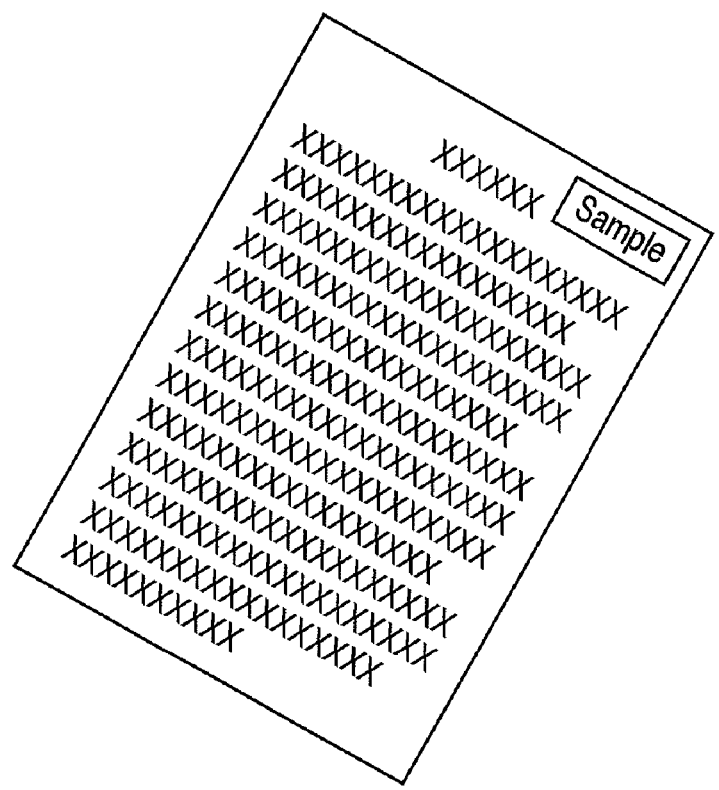
F I G. 6
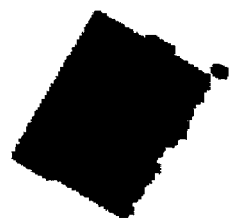
F I G. 7
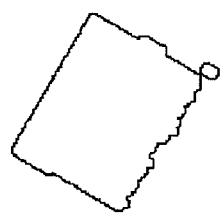

IMAGE PROCESSING APPARATUS AND IMAGE PROCESSING METHOD

BACKGROUND OF THE INVENTION

1. Field of the Invention

The present invention relates to an image processing apparatus that detects an inclination of a document and an image processing method.

2. Description of the Related Art

When character recognition is performed or information embedded in a document is detected, it is necessary to perform processing for detecting an inclination of a document image. Conventionally, there has been a method as shown in FIG. 12 that is used as a method for detecting an inclination of an image. According to this method, a character rectangle is extracted from a character string of a document, and a feature point of each character rectangle (a centroid or a bottom left point or a bottom right point of a character rectangle) is calculated. Thereafter, a Hough transformation is performed on each feature point so that a straight line is calculated, and an inclination angle is detected from the straight line (for example, as described in Japanese Patent Laid-Open No. 03-213053).

However, with the conventional method for detecting an inclination, an inclination angle is detected based on a feature of each character and, thus, the following failures occur.

For example, as shown in FIG. 13, if a character string is constituted from characters having different sizes (or different centroids), since each character rectangle has a different size or is in a different position, the position of a feature point is different and thus an error in the inclination of a straight line occurs, possibly resulting in a decrease in an inclination detection accuracy.

Furthermore, as shown in FIG. 14, if noise appears on a character due to copying, scanning, or the like, the size of a character rectangle is detected to be different from the original size, and as a result, inclination detection accuracy may decrease.

When using the Hough transformation, points on one virtual straight line are counted, and if the number of the points exceeds a prescribed threshold, a straight line including those points is detected; thus, if points are randomly arranged, many straight lines are detected. For example, in the case of a document as shown in FIG. 15, since there are many points on a diagonal line as well, there may be false detection such as a case in which a diagonal line of the document is detected as a straight line considered to indicate an inclination of the document.

SUMMARY OF THE INVENTION

It is desirable to address the aforementioned problems. It is also desirable to provide an image processing apparatus capable of detecting an inclination with high accuracy by detecting an inclination of a document image based on a feature of a document area, and an image processing method.

The present invention in its first aspect provides an image processing apparatus comprising an image input unit configured to input a document image; a reducing unit configured to generate a reduced document image by reducing the document image; an edge image generating unit configured to generate an edge image by extracting at least one edge of the reduced document image; and an inclination detecting unit configured to detect an inclination of the document image based on an inclination of a straight line representing an edge of the edge image.

The present invention in its second aspect provides an image processing method comprising: inputting a document image; generating a reduced document image by reducing the document image; generating an edge image by extracting at least one edge of the reduced document image; and detecting an inclination of the document image based on an inclination of a straight line representing an edge of the edge image.

In an embodiment of the present invention, an inclination of a document image is detected based on a feature of a document area and, thus, detection can be performed with high accuracy.

Further features of the present invention will become apparent from the following description of exemplary embodiments with reference to the attached drawings.

BRIEF DESCRIPTION OF THE DRAWINGS

FIG. 1 is a diagram showing a concept of inclination detection processing in a first exemplary embodiment according to the present invention.

FIG. 5 is a diagram showing an exemplary document image having an inclination of 30[deg] that is to be processed in the first exemplary embodiment.

FIG. 6 is a diagram showing an exemplary reduced document image in the first exemplary embodiment.

FIG. 7 is a diagram showing an exemplary edge image in the first exemplary embodiment.

DESCRIPTION OF THE EMBODIMENTS

Hereinafter, preferred exemplary embodiments of the present invention will be described in detail with reference to the attached drawings. It should be noted that configurations described in the following embodiments are merely exemplary, and the present invention is not limited to the illustrated configurations.

First Exemplary Embodiment

Outline

First, a concept of processing for detecting an inclination of a document image in a first exemplary embodiment will be briefly described with reference to FIG. 1.

First, document image data I that has been input is reduced so as to generate a reduced document image Is. This reduction processing is performed so that characters are connected to each other by being reduced, and an inclination is ultimately detected from an edge of a document area. Here, the document area indicates an area in which characters are written, that is, an area constituted from a plurality of characters, and may be a chapter, a paragraph, or one text line. Note that a document area preferably is one object at this step, and the interior of the document area is filled up when reduction is performed.

Next, the edge of the document area is extracted from the filled-up reduced document image Is so as to generate an edge image Ie. A Laplacian filter, a Sobel filter, or the like may be applied for this edge extraction processing.

Thereafter, a Hough transformation is performed on the edge image Ie so as to detect a straight line adjoining the edge of the document area. That is, the inclination of the straight line detected here indicates the inclination of the document image.

The processing for detecting an inclination of a document image in the first exemplary embodiment was briefly described above; however, detailed description thereof will be given below.

Apparatus Configuration

Figure 2:
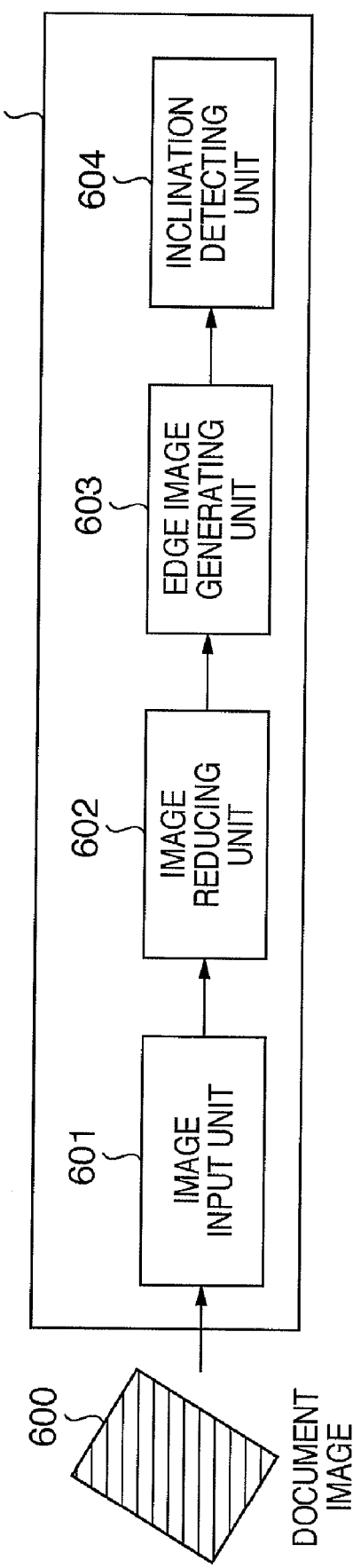
FIG. 2 is a block diagram showing a functional configuration of an image processing apparatus in the first exemplary embodiment.

FIG. 2 is a block diagram showing a functional configuration of an image processing apparatus in the present exemplary embodiment. As shown in FIG. 2, an image processing apparatus 61 in the present exemplary embodiment is an apparatus capable of detecting an inclination of a document image and is constituted from an image input unit 601, an image reducing unit 602, an edge image generating unit 603, and an inclination detecting unit 604.

The image input unit 601 inputs image data (document image 600) that is to be processed in the present exemplary embodiment, by reading or generating the image data obtained through digitization of a document image. The image reducing unit 602 has a function of reducing the document image that has been input, the edge image generating unit 603 has a function of generating an image of an edge portion of a text area from the reduced document image, and the inclination detecting unit 604 has a function of detecting an inclination from the edge image in the text area.

Inclination Detection Processing

Figure 3:
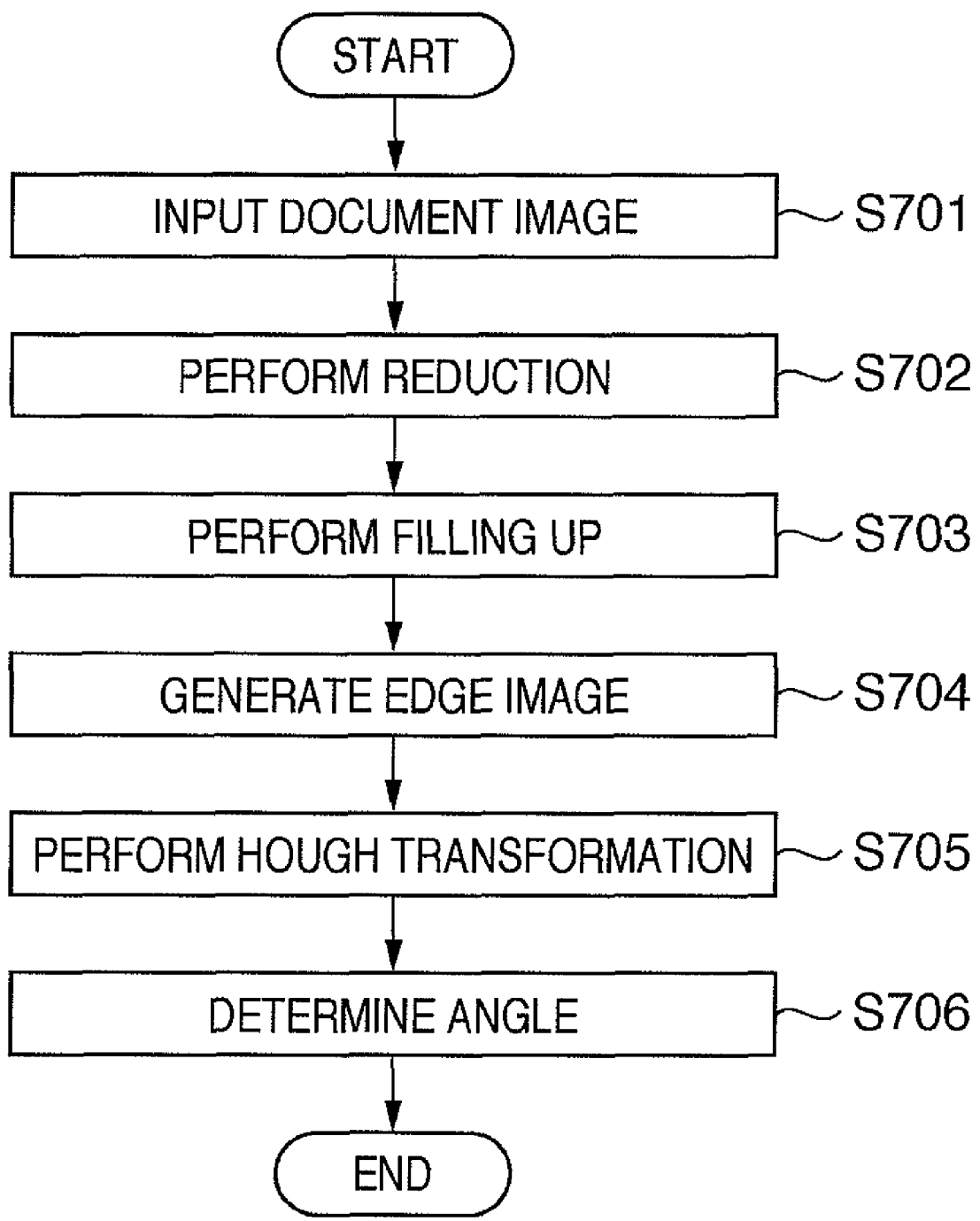
FIG. 3 is a flowchart showing the inclination detection processing in the first exemplary embodiment.

Inclination detection processing in the present exemplary embodiment will be described in detail below with reference to a flowchart shown in FIG. 3.

First, when the document image 600 is input to the image processing apparatus 61 in step S701, the image input unit 601 reads the image and supplies the image reducing unit 602 with the image as document image data I. Here, the document image data I is an image capable of being handled in units of pixels. For example, if the document image is on a paper original, the image input unit 601, which is assumed to have a charge coupled device (CCD) or an optical sensor, generates the document image data I by performing document image capturing, electric signal processing, digital signal processing, and the like in accordance with an image input instruction. In addition, if the document image is data described in a page description language or data created with an application handling a specific data format, the data format is converted into a general image format (e.g. bitmap format, etc.) so as to generate the document image data I.

Next, in step S702, the image reducing unit 602 reduces the document image data I supplied by the image input unit 601 so as to generate the reduced document image Is. There are two steps in the reduction processing (carried out by the image reducing unit 602): a first reducing step referred to here as simple reduction processing to produce a simple reduced image Isp; and a second reducing step referred to as filling up, which produces the reduced document image Is from the simple reduced image Isp.

Figure 4:
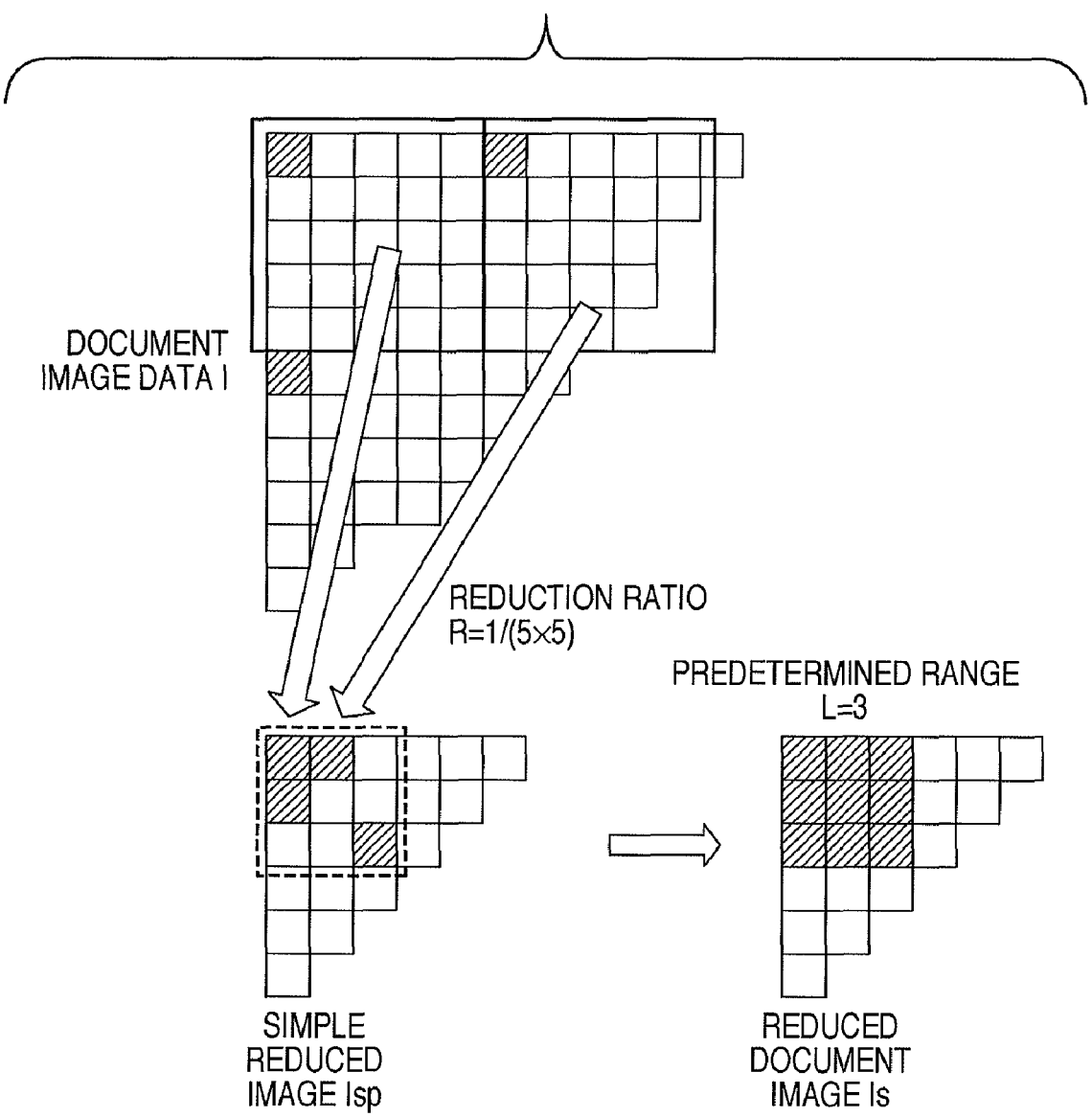
FIG. 4 is a diagram illustrating reduction processing in the first exemplary embodiment.

Here, the reduction processing in the present exemplary embodiment is described with reference to FIG. 4. A reduction ratio is the ratio of number of pixels (usually 1) in the first (or simple) reduced image Isp to number of pixels in the document image data I that has been reduced to the smaller number of pixels in the first reduced image Isp. For example, the reduction ratio may be assumed to be R=1/(5×5) if one pixel in the simple reduced image Isp is reduced from 5×5 pixels in the document image data I. Furthermore, in this case, in the document image data I, if even one black pixel exists in a 5×5 pixel area used as a reduction unit area in accordance with the reduction ratio R above, reduction processing is performed so that the reduction unit area becomes one black pixel in the simple reduced image Isp. Consequently, the value of one pixel to which the reduction unit area corresponds is determined based on the values of a plurality of pixels in the prescribed reduction unit area of the original image data I. By performing reduction processing on such a reduction unit area basis on the entire range of the document image data I, a simple reduced image Isp is generated.

Then, in step S703, the image reducing unit 602 further performs filling up processing (i.e. the second reducing step) on the simple reduced image Isp for connecting characters or text lines so as to generate the reduced document image Is. That is, in the simple reduced image Isp, based on the values of a plurality of pixels in a predetermined range L, the range is filled up with the same pixel value. Specifically, if a black pixel exists in the predetermined range L, all pixels in the predetermined range are made black. FIG. 4 shows an example of filling up performed in the case of the predetermined range L=3 pixels. That is, filling-up in the exemplary embodiment is performed so that all pixels in a 3×3 pixel block are replaced with black pixels if even only one black pixel exists in that block.

Here, selection of a numerical value for the reduction ratio R and the predetermined range L in the present exemplary embodiment is described.

Filling up processing in the present exemplary embodiment is performed in order to extract an edge of a document area by connecting characters or text lines. Therefore, assuming that the space between characters is cs pixels, and the space between text lines is ls pixels, it is sufficient that the reduction ratio R and the predetermined range L are selected such that a combination of the first reduction process using the reduction ratio R and the filling in process using the filling in range L is greater than both cs and ls. In other words, R and L are selected so as to satisfy expressions (1) and (2) below. Note that the expression "$\sqrt{R}$" indicates the square root of R in the following.

$$L \times 1/\sqrt{R} > cs \qquad \text{Exp. (1)}$$

$$L \times 1/\sqrt{R} > ls \qquad \text{Exp. (2)}$$

For example, assume that the size of an original document including an image that is to be input by the image input unit

601 is A4. Since the general character size is from 8 points to 28 points, if the original is read at 600 dpi resolution, the space between characters is approximately 20 pixels to 60 pixels, and the space between text lines is approximately 90 pixels to 250 pixels. Therefore, the aforementioned expressions (1) and (2) become expressions (3) and (4) below in this case and, thus, it is sufficient that the reduction ratio R and the predetermined range L are determined so that their combination is greater than both the maximum number of pixels between characters (i.e. 60 pixels) and the maximum number of pixels between text lines (i.e. 250 pixels). In other words, the selection of R and L is carried out to satisfy the expression (3) and (4).

$$L \times 1/\sqrt{R} > 60 \quad \text{Exp. (3)}$$

$$L \times 1/\sqrt{R} > 250 \quad \text{Exp. (4)}$$

A specific example will now be described. FIG. 6 shows the reduced document image Is obtained by reducing the document image (A4, 600 dpi, 10.5 points) shown in FIG. 5 to 1/(40×40) (i.e. R=1/(40×40)) and performing filling up with the predetermined range being 5 pixels (i.e. L=5). Since the character size of the document image shown in FIG. 5 is 10.5 points, the space between characters is approximately 20 pixels (i.e. cs=20), and the space between the text lines is approximately 80 pixels (i.e. ls=80). Therefore, since conditions are satisfied as indicated by expressions (5) and (6) below, it can be seen that the reduced image becomes one object by the characters and text lines being connected through filling up as shown in FIG. 6.

$$L \times 1/\sqrt{R} = 5 \times 40 = 200, \text{ which is greater than the cs of 20.} \quad \text{Exp. (5)}$$

$$L \times 1/\sqrt{R} = 5 \times 40 = 200, \text{ which is greater than the ls of 80.} \quad \text{Exp. (6)}$$

As described above, the reduced document image Is, which has been reduced and filled up by the image reducing unit 602, is supplied to the edge image generating unit 603.

Referring back to FIG. 3, next in step S704, the edge image generating unit 603 generates the edge image Ie by extracting the edge of the document area from the reduced document image Is supplied by the image reducing unit 602, and transmits the edge image Ie to the inclination detecting unit 604. FIG. 7 shows the edge image Ie generated based on the reduced document image Is shown in FIG. 6. The edge image Ie in the present exemplary embodiment is generated by applying the Laplacian filter on the reduced document image Is. The Laplacian filter is a filter that is generally used when edge emphasis or sharpening is performed, and filter coefficient thereof can be expressed as follows.

$$\begin{bmatrix} 0 & 1 & 0 \\ 1 & -4 & 1 \\ 0 & 1 & 0 \end{bmatrix}$$

Note that rather than being limited to the Laplacian filter, for example, a high-pass filter, the Sobel filter, a Prewitt filter, and the like can be applied for the edge extraction processing as long as the filter emphasizes an edge.

Next, in step S705, the inclination detecting unit 604 detects a straight line adjoining the edge of the document area by performing the Hough transformation on the edge image Ie supplied by the edge image generating unit 603. Then, in step S706, the inclination detecting unit 604 determines an inclination angle Ang of the document area based on the detected straight line.

Here, the Hough transformation is briefly described with reference to FIG. 8. The Hough transformation is a known technique for detecting a straight line or a circular arc from an image.

Figure 8:
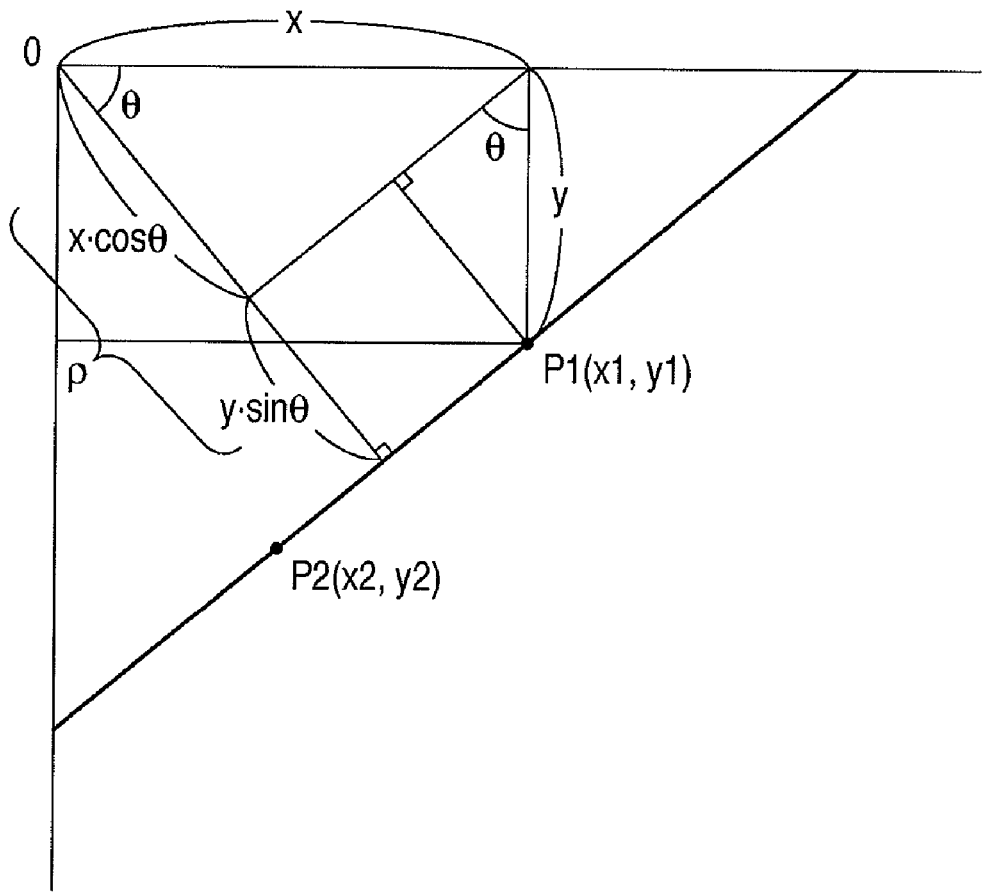
FIG. 8 is a diagram illustrating a Hough transformation in the first exemplary embodiment.

For example, as shown in FIG. 8, an arbitrary straight line that passes through a point P1 (x1, y1) can be expressed by an expression (7) below using a length ρ of a perpendicular line from an origin to the straight line, and an angle θ formed by the perpendicular line with respect to the x-axis passing through the origin O.

$$\rho = x \cdot \cos \theta + y \cdot \sin \theta \quad \text{Exp. (7)}$$

Figure 9:
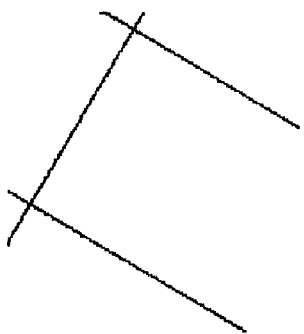
FIG. 9 is a diagram showing exemplary straight lines adjoining an edge of a document area detected in the first exemplary embodiment.

Here, if another point such as a point P2 (x2, y2) is on the same straight line, the angle θ and the length ρ with respect to the point P2 are the same as those with respect to the point P1. Therefore, in the plane of the document image, points with respect to which the angle θ and the length ρ are the same are counted, and if the number of such points is greater than or equal to a prescribed threshold, it can be derived that a straight line exists there. FIG. 9 shows an exemplary drawing of straight lines adjoining the edge of the document area obtained by performing calculation using the Hough transformation on the edge image Ie shown in FIG. 7.

As described above, as for a straight line adjoining the edge of the document area detected using the Hough transformation, an inclination angle (hereinbelow referred to as A) thereof is namely the inclination angle Ang of the document area.

Processing for Selecting from a Plurality of Inclinations

Note that for the inclination angle A of a straight line adjoining the edge of the document area, more than one value may be calculated, and there may be a case in which, for example, two inclination angles A1 and A2 are calculated. This is because straight lines that respectively adjoin a top portion and a lateral portion of the document area have been detected. In the present exemplary embodiment, if a plurality of straight lines that have different inclinations are detected, the inclination angle Ang is ultimately selected as follows.

For example, the following two values are assumed to be detected as the calculated inclination angle A of a straight line. Note that a positive/negative value of the inclination angle indicates clockwise/counterclockwise, respectively.

A1=30[deg]
A2=−60[deg]

In the present exemplary embodiment, if the above two inclination angles A1 and A2 are detected, the inclination angle whose absolute value is smaller, that is, A1=30[deg] is determined to be the inclination angle Ang.

Further, there is a case in which a plurality of straight lines are detected in addition to a straight line adjoining the edge of the document area due to the influence of noise. For example, the plurality of inclination angle candidates below are assumed to be calculated through the Hough transformation.

A1=30[deg]
A2=−15[deg]
A3=30[deg]
A4=−60[deg]
A5=30[deg]

Figure 10:
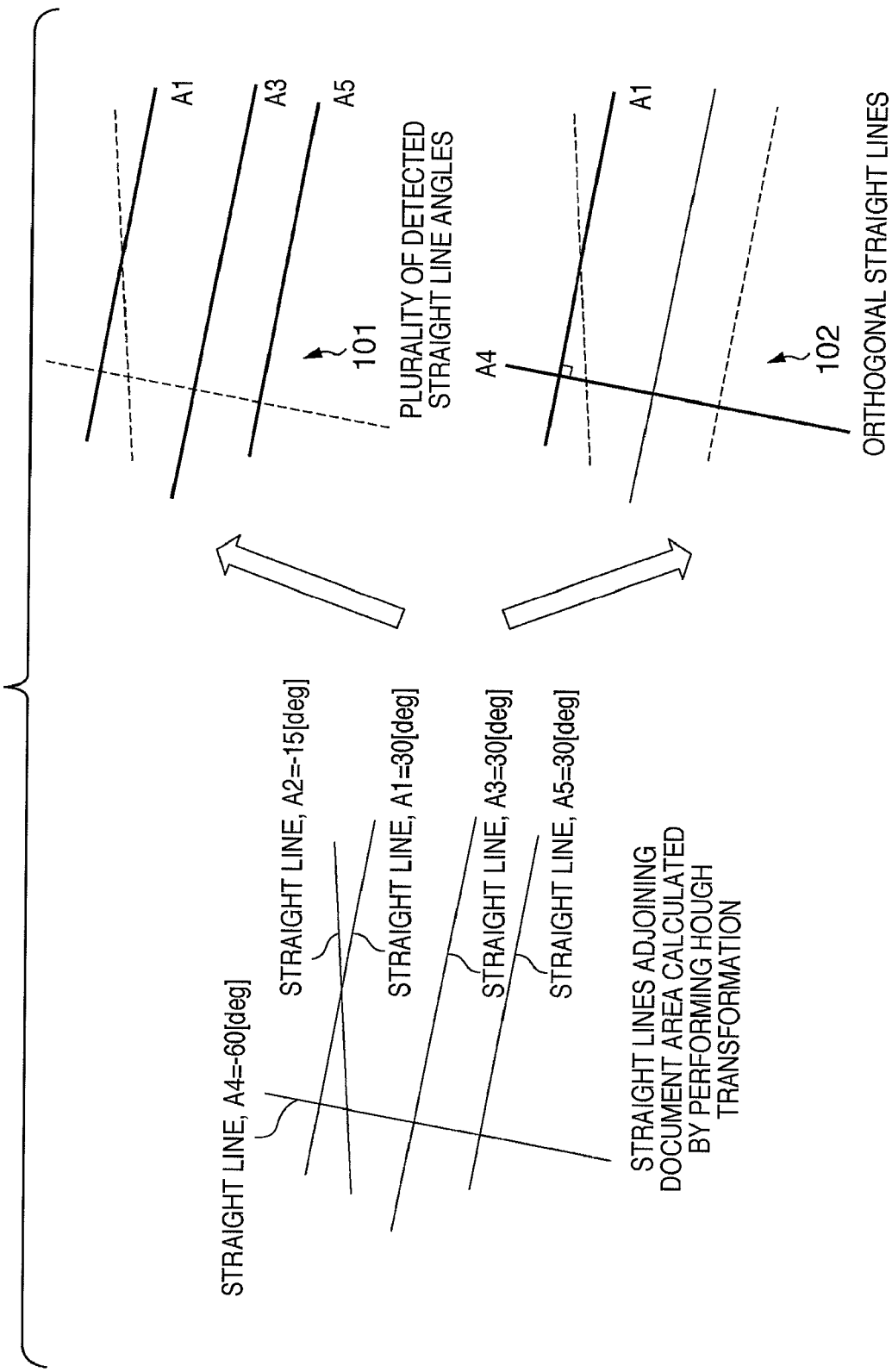
FIG. 10 is a diagram showing a method for determining an inclination angle in the first exemplary embodiment.

FIG. 10 shows examples of these straight lines. In the present exemplary embodiment, either one of two processes described below (process (a) and process (b)) is performed or a combination of these two processes is performed in order to increase the accuracy of detecting the inclination angle in such a case.

Process (a): Selecting a Plurality of Detected Straight Lines

As indicated by reference numeral 101 in FIG. 10, a straight line adjoining the edge of the document area may be detected for each text line. In this case, the most frequently appearing straight-line angle, that is, the angle A1, A3 and A5 that are each 30[deg], is determined to be the inclination angle.

Process (b): Selecting Orthogonal Straight Lines

Using a characteristic that a straight line adjoining the top portion of the document area and a straight line adjoining the lateral portion of the document area generally cross at a right angle, two orthogonal lines are selected from the detected straight lines so as to determine the inclination angle. In this case, as indicated by reference numeral 102 in FIG. 10, a straight line whose angle is A1 (or A3 or A5) and a straight line whose angle is A4 cross at a right angle and, thus, the inclination angle can be considered to be either 30[deg] or −60[deg]. Therefore, the smaller inclination angle, that is, A1=30[deg] is determined to be the inclination angle Ang.

Note that if there are no most frequently appearing straight line angle and no orthogonal straight lines, a method in which a straight line including the greatest number of points is selected may be applied.

As described above, in the present exemplary embodiment, a document image is reduced, and an inclination is detected based on a feature of a reduced document area and, thus, regardless of the character size, or even if noise appears on a character, the inclination of the document image can be detected with high accuracy.

Note that although a black and white binary image is described as an example of a document image to be input in the present exemplary embodiment, the present invention is not limited to this and is also applicable to a color image. For example, in the case of a color image, a reduced binary image is generated by performing high/low determination based on a prescribed threshold, and thereafter, the same processing as that in the present exemplary embodiment may be performed.

Second Exemplary Embodiment

Hereinafter, a second exemplary embodiment according to the present invention will be described. A characteristic feature of the second exemplary embodiment is that the processes according to the first exemplary embodiment described above are realized by a computer program that is executed by a computer in order to make an image processing device to which the computer is connected (or the computer itself if it is acting as an image processing device) more efficient in determining (and outputting a result for) an inclination of an image in a document.

Figure 11:
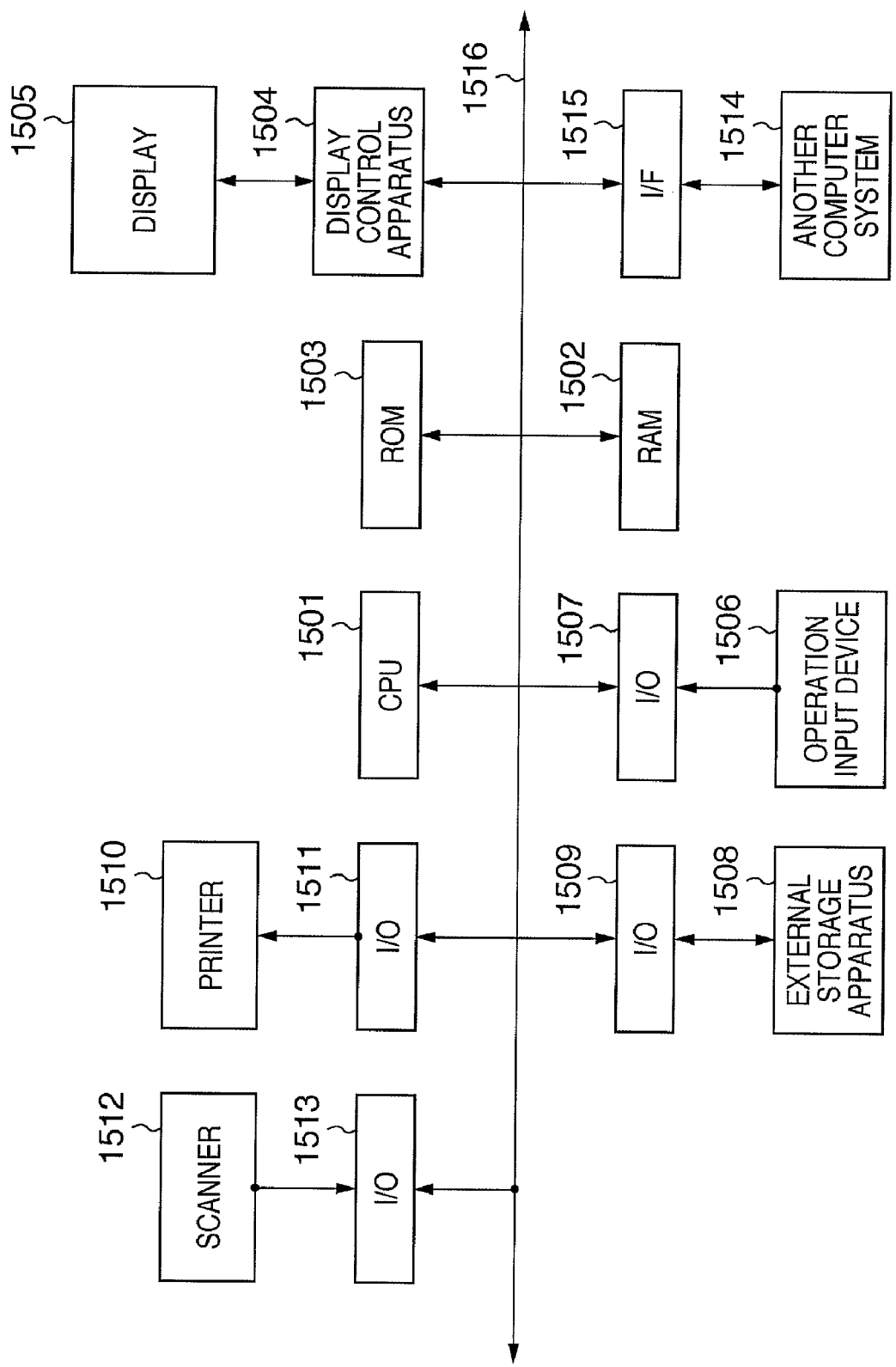
FIG. 11 is a block diagram showing a computer system configuration in a second exemplary embodiment.
Figure 12:
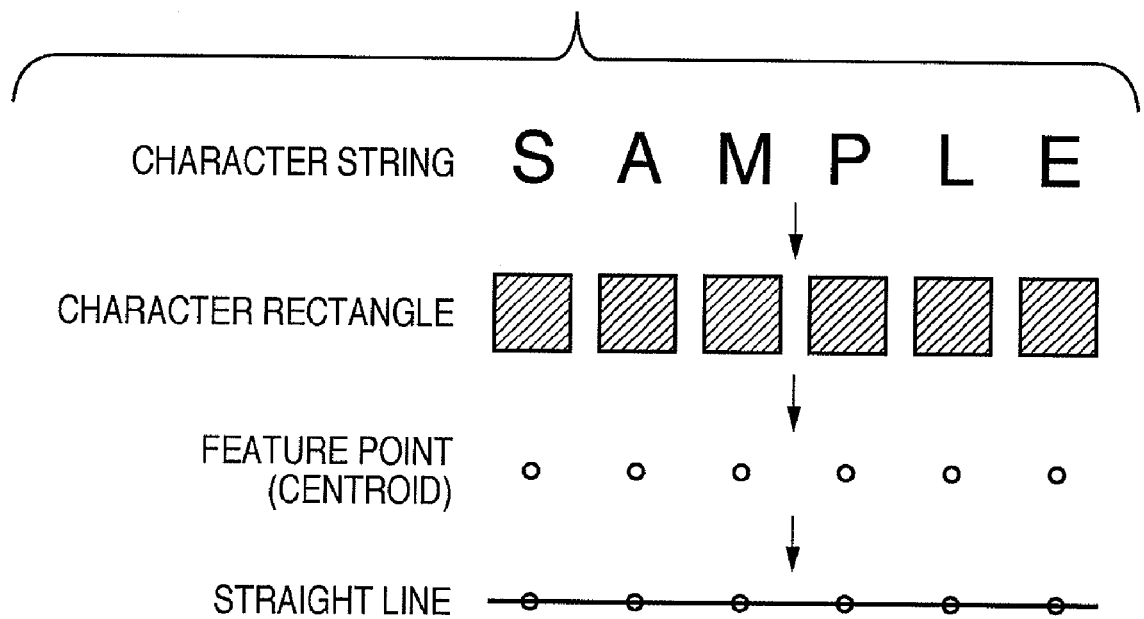
FIG. 12 is a diagram illustrating a conventional method for detecting an inclination.
Figure 13:
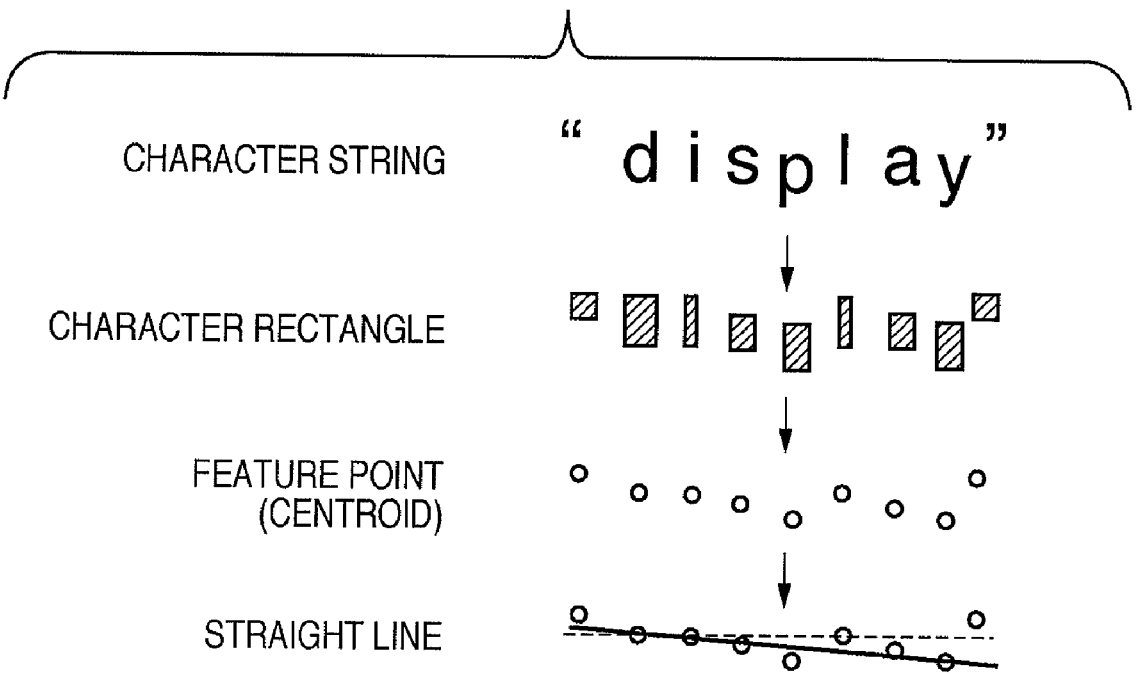
FIG. 13 is a diagram showing an exemplary failure that occurs when using the conventional method for detecting an inclination.
Figure 14:
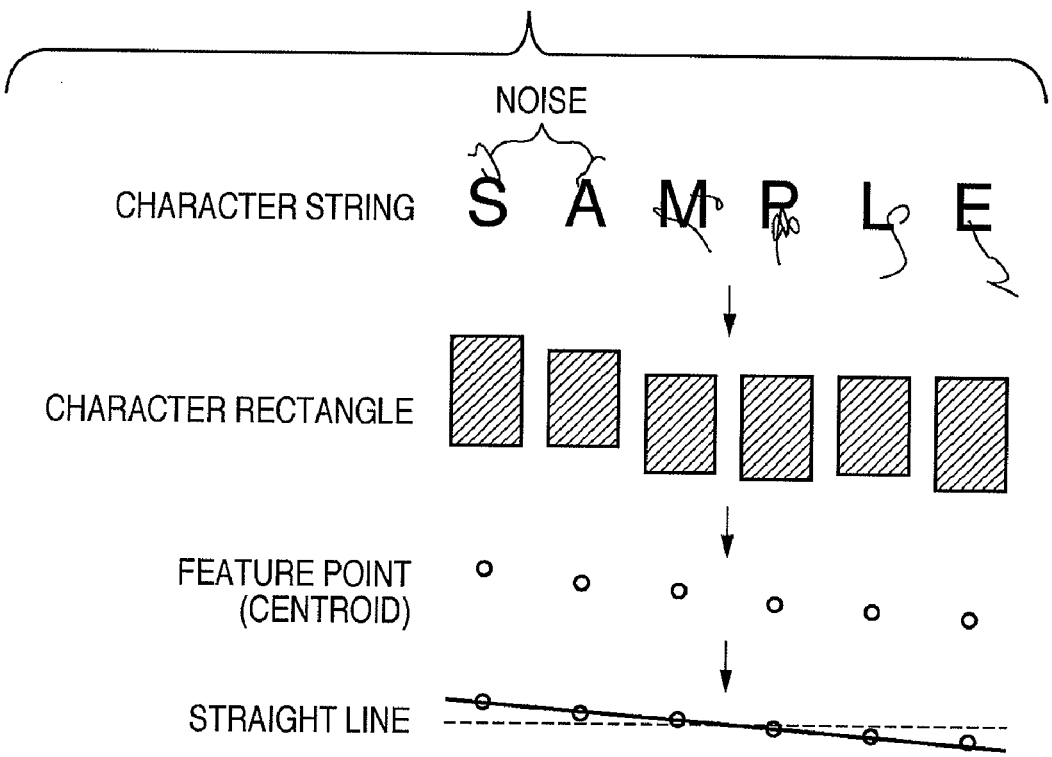
FIG. 14 is a diagram showing an exemplary failure that occurs when using the conventional method for detecting an inclination.
Figure 15:
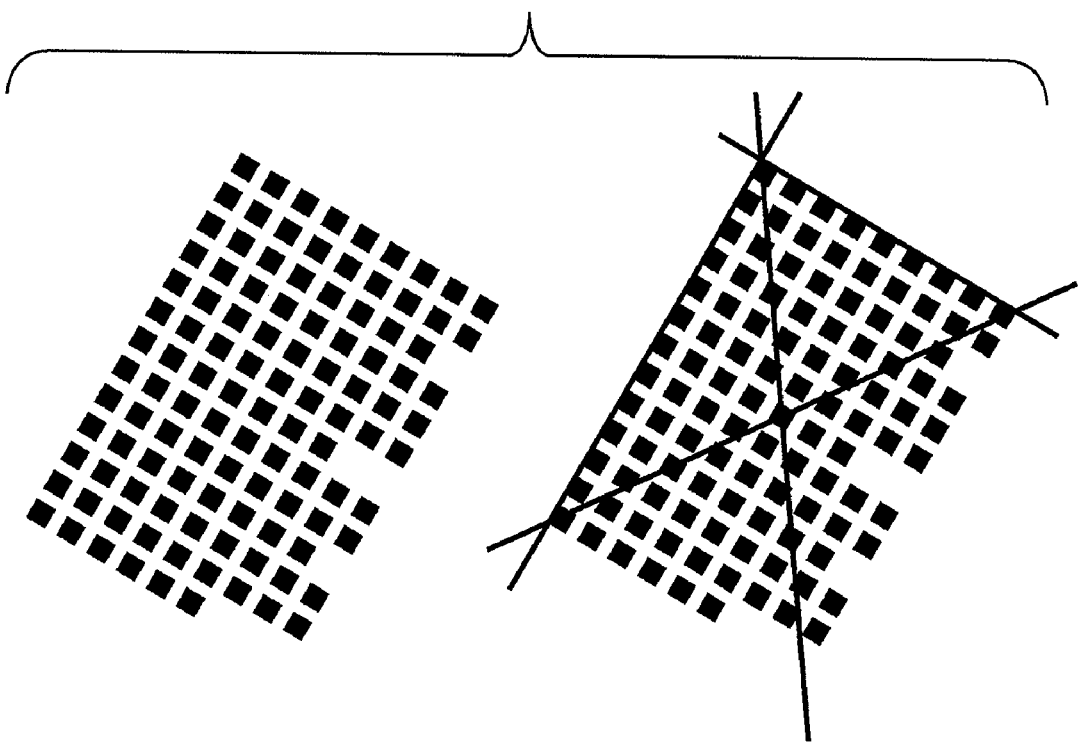
FIG. 15 is a diagram showing an exemplary failure that occurs when using the conventional method for detecting an inclination.

FIG. 11 is a block diagram showing a basic configuration of a computer in the second exemplary embodiment. For example, when the computer executes all the functions of the aforementioned first exemplary embodiment, it is sufficient that each functional configuration is represented by a program function or a subroutine and that the computer is caused to read and execute the function or subroutine.

In FIG. 11, reference numeral 1501 denotes a CPU that performs overall control of the computer using a program or data stored in a RAM 1502 or a ROM 1503 and also performs each process described in the aforementioned first exemplary embodiment.

Reference numeral 1502 denotes a RAM that includes an area for temporarily storing a program or data loaded from, for example, an external storage apparatus 1508, and also includes a necessary area for the CPU 1501 to perform various processes. Note that, a program or data downloaded from another computer system 1514 via an I/F (interface) 1515 can also be temporarily stored.

Reference numeral 1503 denotes a ROM that stores a function program of the computer, setting data, and the like. Reference numeral 1504 denotes a display control apparatus that performs control processing for displaying an image, a character, and the like on a display 1505. Reference numeral 1505 denotes a display that displays an image, a character, and the like. Note that a CRT, a liquid crystal display, or the like is suitable for the display 1505.

Reference numeral 1506 denotes an operation input device that is constituted from a device, such as a keyboard and a mouse, with which various instructions can be input to the CPU 1501. Reference numeral 1507 denotes an I/O for notifying the CPU 1501 with various instructions and the like that have been input via the operation input device 1506.

Reference numeral 1508 denotes an external storage apparatus, such as a hard disk, which functions as a high-capacity information storage apparatus, and which stores an OS (operating system), a program for causing the CPU 1501 to execute processing according to the aforementioned first exemplary embodiment, an input/output original image, and the like. Writing information to or reading information from the external storage apparatus 1508 is performed via an I/O 1509.

Reference numeral 1510 denotes a printer for outputting a document or an image, which receives output data transmitted from the RAM 1502 or the external storage apparatus 1508 via an I/O 1511. Note that examples of a printer for outputting a document or an image include an ink-jet printer, a laser printer, a thermal-transfer printer, a dot impact printer, and the like.

Reference numeral 1512 denotes a scanner for reading a document or an image, which transmits input data to the RAM 1502 or the external storage apparatus 1508 via an I/O 1513.

Reference numeral 1516 denotes a bus for connecting the CPU 1501, the ROM 1503, the RAM 1502, the I/O 1511, the I/O 1509, the display control apparatus 1504, the I/F 1515, the I/O 1507, and the I/O 1513.

Note that although an example of a computer being caused to perform processing except scanning or printing is described in the second exemplary embodiment, a dedicated hardware circuit in the scanner 1512 or printer 1510 may instead perform processing that is performed by the computer.

As described above, in the second exemplary embodiment, a computer can realize functions of the aforementioned first exemplary embodiment.

Further Features of the Exemplary Embodiments

The aforementioned first and second exemplary embodiments merely illustrate embodied examples when implementing the present invention and, thus, the technical scope of the present invention is not interpreted as being limited thereby. According to embodiments, all of edges of the reduced image are used for generating the edge image, but the edge image may be generated by extracting at least one edge of the reduced image. Furthermore, the present invention may be embodied in various other forms without departing from the technical ideas or essential characteristics thereof. For example, although an example of a computer being caused to realize the present invention is described in the above second exemplary embodiment, the technical scope considered to be the scope of the present invention will be described below in further detail.

The present invention can be embodied, for example, using a system, an apparatus, a method, a program, a storage medium (recording medium), and the like. Specifically, the present invention may be applied to a system constituted from a plurality of devices (for example, a host computer, an interface device, a capturing apparatus, a web application, etc.), or may also be applied to an apparatus constituted from one device.

The present invention may also be accomplished by supplying directly or remotely a program of software that realizes the functions of the aforementioned exemplary embodiments to a system or an apparatus, and by a computer in the system or apparatus reading out and executing the supplied program code. It should be noted that the program in this case is a computer readable program that corresponds to flowcharts illustrated in figures in the exemplary embodiments.

Therefore, the present invention is also realized by the program code itself installed on a computer for realizing the functional processing of the present invention on the computer. That is, the present invention also includes the computer program itself for realizing the functional processing of the present invention.

In this case, the program may take a form such as an object code, a program to be executed by an interpreter, script data supplied to an OS, and so on as long as it has the functionality of the program.

Examples of a recording medium for supplying the program include the media described below. For example, a recording medium such as a floppy (registered trademark) disk, a hard disk, an optical disk, a magneto-optical disk, an MO, a CD-ROM, a CD-R, a CD-RW, magnetic tape, a non-volatile memory card, a ROM, a DVD (DVD-ROM, DVD-R) can be used.

A method described below can be applied as a method for supplying a program. That is, using a browser of a client computer to connect to an Internet website, the computer program itself of the present invention (or a compressed file including an automatic installation function) is downloaded to a recording medium such as a hard disk. Furthermore, this method can be realized by dividing the program code that makes up the program of the present invention into a plurality of files and downloading each file from different websites. In other words, a WWW server that allows a plurality of users to download the program files for realizing the functional processing of the present invention through a computer is also included within the scope of the present invention.

The program of the present invention may furthermore be encrypted and stored in a storage medium such as a CD-ROM that is then distributed to users, where users who satisfy certain predetermined conditions are allowed to download key information for decrypting the programs from a website via the Internet. That is, the user can execute the encrypted program by using the key information and install the program in the computer.

The functionality of the aforementioned exemplary embodiments can be realized by a computer executing the read-out program. Furthermore, an OS or the like running on a computer may execute part or all of the actual processing based on instructions in the program, and the functionality of the aforementioned exemplary embodiments can be realized by such processing.

Furthermore, the program read out from the recording medium may be written into a memory provided in a function expansion board inserted into the computer or a function expansion unit connected to the computer, and executed, thereby, realizing the functionality of the aforementioned exemplary embodiments. That is, a CPU or the like included in the function expansion board or function expansion unit can perform all or part of the actual processing based on instructions included in the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-160949, filed Jun. 19, 2008, which is hereby incorporated by reference herein in its entirety.

What is claimed is:

1. An image processing apparatus, comprising:
an image input unit configured to input a document image;
a reducing unit configured to generate a reduced document image by reducing the document image;
an edge image generating unit configured to generate an edge image by extracting at least one edge of the reduced document image; and
an inclination detecting unit configured to detect an inclination of the document image based on an inclination of a straight line representing an edge of the edge image, wherein said inclination detecting unit detects the straight line representing the edge of the edge image by performing a Hough transformation, and detects the inclination of the document image based on an inclination of the straight line, and
wherein said inclination detecting unit is operable, if a plurality of straight lines that have different inclinations are detected, to determine a smallest inclination among the inclinations of the plurality of straight lines to be the inclination of the document image.

2. The image processing apparatus according to claim 1, wherein said reducing unit includes:
a first reducing unit configured to generate a first reduced image from the document image, wherein the document image comprises at least one reduction unit area, which contains a plurality of pixels, and the first reducing unit is configured to determine a value of each pixel of the first reduced image based on values of said plurality of pixels in a corresponding such reduction unit area; and
a second reducing unit configured to generate the reduced document image from the first reduced image by allocating the same pixel value to a predetermined range of pixels within the first reduced image, the allocated pixel value being based on at least one of the values of the pixels in the predetermined range.

3. The image processing apparatus according to claim 1, wherein said edge image generating unit performs edge extraction using a Laplacian filter.

4. The image processing apparatus according to claim 1, wherein said edge image generating unit performs edge extraction using a high-pass filter.

5. The image processing apparatus according to claim 1, wherein the reducing unit generates the reduced document image by:
determining, if even one black pixel exists in a reduction unit area in accordance with the reduction ratio R, a corresponding pixel in a simple reduced image as being a black pixel, and
filling up, with black pixels, pixels in a range "L" to connect characters or text lines in the simple reduced image if even one black pixel exists in the range L,
wherein R and L are selected so as to satisfy expressions (1) and (2):

$$L \times 1/R > cs \qquad (1)$$

$$L \times 1/R > ls \qquad (2)$$

where cs indicates the space between characters and ls indicates the space between text lines.

6. An image processing apparatus, comprising:
an image input unit configured to input a document image;
a reducing unit configured to generate a reduced document image by reducing the document image;
an edge image generating unit configured to generate an edge image by extracting at least one edge of the reduced document image; and
an inclination detecting unit configured to detect an inclination of the document image based on an inclination of a straight line representing an edge of the edge image, wherein said inclination detecting unit detects the straight line representing the edge of the edge image by performing a Hough transformation and detects the inclination of the document image based on an inclination of the straight line, and
wherein said inclination detecting unit is operable, if a plurality of straight lines that have different inclinations are detected, to select two orthogonal lines, and to determine a smaller inclination between the inclinations of the two straight lines to be the inclination of the document image.

7. The image processing apparatus according to claim 6, wherein the reducing unit generates the reduced document image by:
determining, if even one black pixel exists in a reduction unit area in accordance with the reduction ratio R, a corresponding pixel in a simple reduced image as being a black pixel, and
filling up, with black pixels, pixels in a range "L" to connect characters or text lines in the simple reduced image if even one black pixel exists in the range L,
wherein R and L are selected so as to satisfy expressions (1) and (2):

$$L \times 1/R > cs \quad (1)$$

$$L \times 1/R > ls \quad (2)$$

where cs indicates the space between characters and ls indicates the space between text lines.

8. An image processing method comprising:
inputting a document image;
generating a reduced document image by reducing the document image;
generating an edge image by extracting at least one edge of the reduced document image; and
detecting an inclination of the document image based on an inclination of a straight line representing an edge of the edge image, wherein the straight line representing the edge of the edge image is detected by performing a Hough transformation, and the inclination of the document image is detected based on an inclination of the straight line,
wherein if a plurality of straight lines that have different inclinations are detected, a smallest inclination among the inclinations of the plurality of straight lines is determined to be the inclination of the document image, and
wherein at least one processor executes steps stored in a memory to perform at least one of the inputting, generating, and detecting.

9. The image processing method according to claim 8, wherein the reducing of the document image further includes:
generating a first reduced image from the document image, wherein the document image comprises at least one reduction unit area, which contains a plurality of pixels, and the first reducing step determines a value of each pixel of the first reduced image based on values of the pixels in a corresponding such reduction unit area; and
generating the reduced document image from the first reduced image by allocating a same pixel value to a predetermined range of pixels within the first reduced image, the allocated pixel value being based on at least one of the values of the pixels in the predetermined range.

10. The method according to claim 8, wherein in the reduced document image generating step, the reduced document image is generated by:
determining, if even one black pixel exists in a reduction unit area in accordance with the reduction ratio R, a corresponding pixel in a simple reduced image as being a black pixel, and
filling up, with black pixels, pixels in a range "L" to connect characters or text lines in the simple reduced image if even one black pixel exists in the range L,
wherein R and L are selected so as to satisfy expressions (1) and (2):

$$L \times 1/R > cs \quad (1)$$

$$L \times 1/R > ls \quad (2)$$

where cs indicates the space between characters and is indicates the space between text lines.

11. A computer-readable storage medium storing a computer program configured, when run on a computer, to cause said computer to:
input a document image;
generate a reduced document image by reducing the document image;
generate an edge image by extracting at least one edge of the reduced document image; and
detect an inclination of the document image based on an inclination of a straight line representing an edge of the edge image, wherein the straight line representing the edge of the edge image is detected by performing a Hough transformation, and the inclination of the document image is detected based on an inclination of the straight line,
wherein if a plurality of straight lines that have different inclinations are detected, a smallest inclination among the inclinations of the plurality of straight lines is determined to be the inclination of the document image.

12. An image processing method, comprising:
inputting a document image;
generating a reduced document image by reducing the document image;
generating an edge image by extracting at least one edge of the reduced document image; and
detecting an inclination of the document image based on an inclination of a straight line representing an edge of the edge image, wherein the straight line representing the edge of the edge image is detected by performing a Hough transformation, and the inclination of the document image is detected based on an inclination of the straight line,
wherein if a plurality of straight lines that have different inclinations are detected, two orthogonal lines are selected, and a smaller inclination between the inclinations of the two straight lines is determined to be the inclination of the document image, and
wherein at least one processor executes steps stored in a memory to perform at least one of the inputting, generating, and detecting.

13. The method according to claim 12, wherein in the reduced document image generating step, the reduced document image is generated by:
- determining, if even one black pixel exists in a reduction unit area in accordance with the reduction ratio R, a corresponding pixel in a simple reduced image as being a black pixel, and
- filling up, with black pixels, pixels in a range "L" to connect characters or text lines in the simple reduced image if even one black pixel exists in the range L,
- wherein R and L are selected so as to satisfy expressions (1) and (2):

$$L \times 1/\sqrt{R} > cs \qquad (1)$$

$$L \times 1/\sqrt{R} > ls \qquad (2)$$

where cs indicates the space between characters and ls indicates the space between text lines.

14. A non-transitory computer-readable storage medium storing a computer program configured, when run on a computer, to cause said computer to:
- input a document image;
- generate a reduced document image by reducing the document image;
- generate an edge image by extracting at least one edge of the reduced document image; and
- detecting an inclination of the document image based on an inclination of a straight line representing an edge of the edge image, wherein the straight line representing the edge of the edge image is detected by performing a Hough transformation, and the inclination of the document image is detected based on an inclination of the straight line, and
- wherein if a plurality of straight lines that have different inclinations are detected, two orthogonal lines are selected, and a smaller inclination between the inclinations of the two straight lines is determined to be the inclination of the document image.

* * * * *